May 17, 1932.　　　　　G. JOHNSON　　　　　1,859,254
PIN FASTENER
Filed Sept. 24, 1931
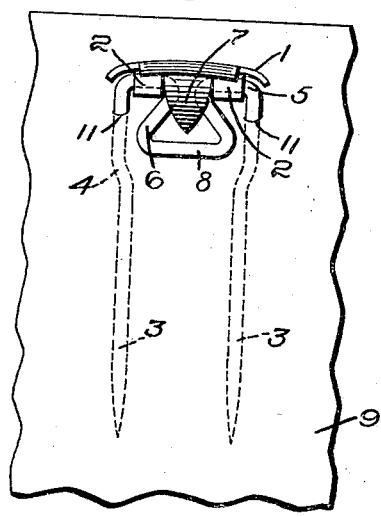
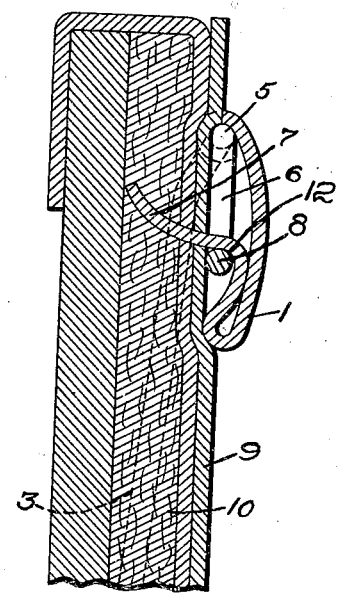
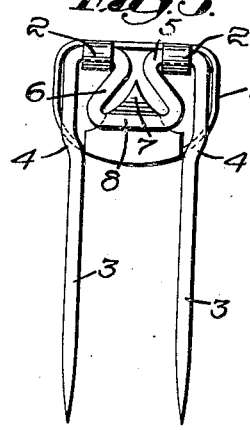
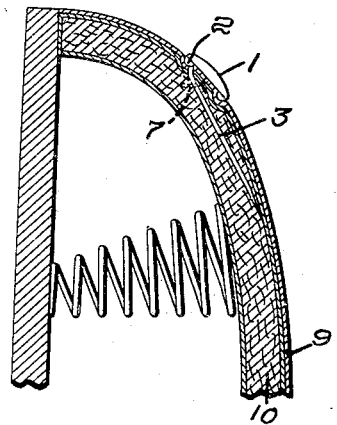
Inventor:
Gustav Johnson
by Emery, Booth, Varney & Townsend
Attys Patented May 17, 1932

1,859,254

UNITED STATES PATENT OFFICE

GUSTAV JOHNSON, OF WEST ROXBURY, MASSACHUSETTS, ASSIGNOR TO UNITED-CARR FASTENER CORPORATION, OF CAMBRIDGE, MASSACHUSETTS, A CORPORATION OF MASSACHUSETTS

PIN FASTENER

Application filed September 24, 1931. Serial No. 564,804.

My invention aims to provide improvements in pin fasteners particularly, though not exclusively, useful in connection with the attachment of slip covers and the like to various types of upholstery installations.

In the drawings which illustrate a preferred embodiment of my invention:—

Figure 1 is an elevation view of a portion of an installation showing my pin fastener as it appears when the fastener locking and stabbing prong is about to be entered into the material held under tension by the pin legs;

Fig. 2 is an enlarged vertical section taken through a portion of an upholstery installation and through the pin fastener showing the manner in which the fastener is attached to the installation;

Fig. 3 is a rear elevation of the pin fastener; and

Fig. 4 is a vertical section taken through a portion of an upholstery insulation wherein the upholstery is more apt to yield against the pressure of the stabbing prong than in the type of installation shown in Fig. 2.

While I have illustrated in the drawings my invention in connection with one particular pin fastener structure, it should be understood that the idea of providing means for holding the slip cover, or the like, under tension while a stabbing prong is being forced therethrough may be used in connection with any desirable pin fastener structure.

Heretofore, so far as I am aware, hinged pin fastener structures having stabbing prongs carried by the hinged part have been provided with a pair of parallel sharp pointed pin legs spaced the same distance apart throughout their lengths. I have found that with this type of structure certain materials used as slip covers or the like are not pierced by the stabbing prong when the hinged part is pressed into locking position. Therefore, the fastener is improperly attached and is likely to become accidentally displaced from the installation. The difficulties just described occur more particularly in connection with installations such as shown in Fig. 4, because the upholstery material is somewhat free to yield against the pressure of the stabbing prong.

In order to overcome the objections referred to above, I have provided a pin fastener with means whereby the material to be attached to the upholstery installation is held under tension while the stabbing prong is being pressed thereagainst. In fact it might be accurately stated that the material is stretched adjacent to the point where the stabbing prong is to pierce it.

Referring to the particular structure illustrated by the drawings, I have shown (Fig. 3) a pin fastener having an attaching part formed from wire and a plate part 1 secured to the attaching part in hinged relation thereto by means of hinge portions 2—2.

The attaching part is preferably made from a single piece of wire and has two sharp pointed legs 3 spaced from each other and having bends 4 whereby the lower portions of the legs are spaced closer together in parallel relation than the upper portions of the legs for the purposes hereinafter described. The legs are secured together at their upper ends by a connecting portion 5 having a triangular-shaped loop 6 formed therein and located between the widely spaced portions of the legs 3. The hinge portions 2—2 of the plate 1 engage the connecting portion 5 at opposite sides of the loop 6, as best shown in Figs. 1 and 3. The plate part 1 has locking means in the form of a sharp pointed stabbing prong 7 extending from the lower edge first upwardly underneath the plate part and then outwardly away from the plate part, as shown in Fig. 2. The stabbing prong 7 is curved longitudinally throughout that portion which extends away from the plate 1 and is adapted to cooperate with the flat portion 8 of the loop 6 to hold the plate in a locked position with relation to the attaching part.

To attach the fastener to an upholstery structure such as shown in either Fig. 2 or Fig. 4 the plate part 1 is first swung into unlocked position (Fig. 1) substantially at right angles to the attaching part. Then with the plate part 1 grasped between the thumb and the first and second fingers the sharp pointed legs 3 may be easily forced through the slip cover 9 and into embedding relation with the upholstery 10. Since the slip cover 9 is pierced by the sharp pointed legs 3 at a given spaced relation adjacent to the points and since that spaced relation is less than the distance between those portions of the legs 3 above the bends 4, it will be apparent to those skilled in the art that as the legs 3 are forced into the installation and past the bends 4 the material will have to stretch for an area located between the holes 11—11 (Fig. 1) in order to adapt the spacing thereof to the increased distance between those portions of the legs above the bends 4. It will be readily understood therefore that the material underlying the loop 6 is held under tension by the legs 3 of the attaching part. With the installation in the condition just previously stated the plate part 1 is then pressed toward the slip cover 9 and the stabbing prong 7 will be readily forced through the slip cover and into the upholstery material, thereby locking the fastener against accidental removal, as shown in Figs. 2 and 4. During the latter part of the attaching operation the stabbing prong 7 passes adjacent to the flat portion 8 of the loop 6 and when the plate part 1 is pressed against the slip cover 9 the flat portion 8 of the loop 6 will enter an irregularity 12 formed in the prong 7, thereby securely locking the plate in position against accidental unlocking thereof. When the fastener is attached as above described removal is resisted by the stabbing prong 7 and also by the bends 4 in the legs 3. To remove the fastener it is merely necessary to lift the lower edge of the plate part 1 thereby pulling the prong 7 free from the installation. The fastener may then be grasped by the plate part 1 and removed by exerting an upward pull thereon.

While I have illustrated and described a preferred embodiment of my invention I do not wish to be limited thereby, because the scope of my invention is best defined by the following claims.

I claim:

1. A pin fastener comprising, in combination, a plate part, attaching means for securing said plate part to a suitable material, hinge means securing said plate part and attaching means together, a stabbing prong extending from said plate part and said attaching means having a pair of sharp pointed legs spaced closer together adjacent to their pointed ends than at the opposite ends whereby a material pierced by the legs is tensioned when the fastener is attached to facilitate piercing of the material by the stabbing prong.

2. A pin fastener comprising, in combination, an attaching part having a pair of sharp pointed legs, a portion connecting said legs together at one end, a part hinged to said connecting portion and having a stabbing prong extending rearwardly therefrom and each of said legs having a bend spacing said legs closer together adjacent to their pointed ends than at the opposite ends whereby a material pierced by the legs is tensioned when the fastener is attached to facilitate piercing of the material by the stabbing prong.

3. A pin fastener comprising, in combination, an attaching part having a pair of sharp pointed legs, a portion connecting said legs together at one end, a part hinged to said connecting portion and having a stabbing prong extending rearwardly therefrom and each of said legs having a bend spacing said legs closer together adjacent to their pointed ends than at the opposite ends whereby a material pierced by the legs is tensioned when the fastener is attached to facilitate piercing of the material by the stabbing prong and means provided partly by the stabbing prong and partly by the attaching part whereby the hinged part may be locked in a given position with relation to the attaching part.

4. A pin fastener comprising, in combination, an attaching part having a pair of sharp pointed legs, a portion connecting said legs together at one end, a part hinged to said connecting portion and having a stabbing prong extending rearwardly therefrom and each of said legs having a bend spacing said legs closer together adjacent to their pointed ends than at the opposite ends whereby a material pierced by the legs is tensioned when the fastener is attached to facilitate piercing of the material by the stabbing prong, and said stabbing prong being located between said bends in said legs and the connected ends of said legs.

5. A double pointed pin fastener comprising an attaching part and a plate part 1, the attaching part having two sharp pointed legs 3 connected by a portion 5 having a triangular-shaped loop 6 located between the legs 3, a flat portion 8 provided at the end of said triangular-shaped loop 6 thereby providing a substantial bearing surface, hinges 2—2 provided by the plate part 1 and engaging the connecting portion 5, a stabbing prong 7 located beneath the plate part 1 and having a sharp pointed prong for engagement with the medium to which the fastener is to be attached to lock it in place and for engagement with the flat bearing surface of the triangular-shaped loop 6 to lock the plate part 1 in a given relation to the attaching part and each of said legs 3 having a bend 4 spacing said legs closer together adjacent to their pointed ends than at the opposite ends whereby a material pierced by the legs is tensioned when the fastener is attached to facilitate piercing of the material by the stabbing prong 7.

In testimony whereof, I have signed my name to this specification.

GUSTAV JOHNSON.